July 24, 1923.
E. M. ROBERTS
FISHING TACKLE.
Filed May 17, 1921
1,463,062
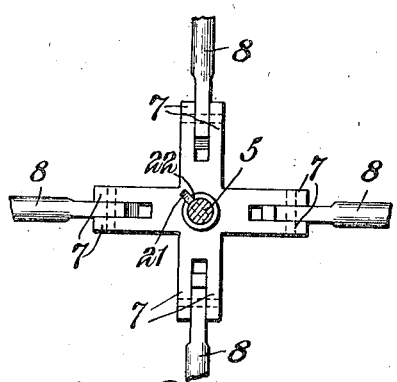
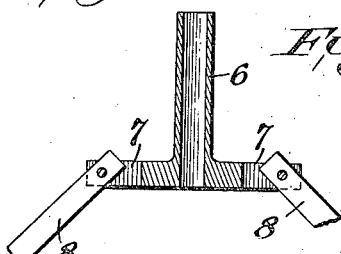
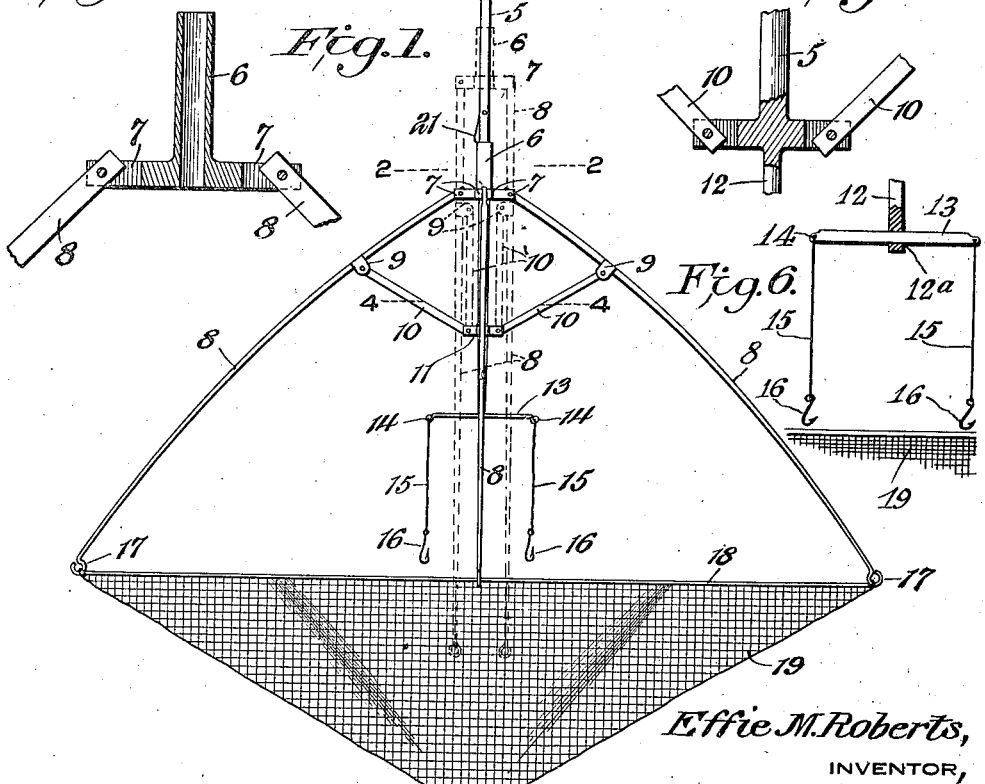
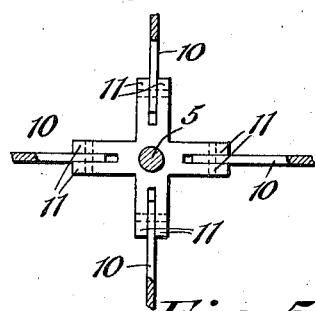
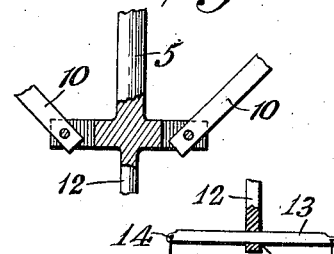
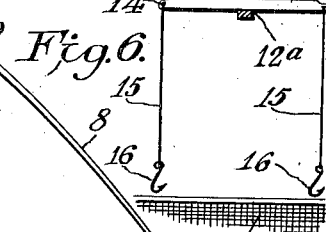
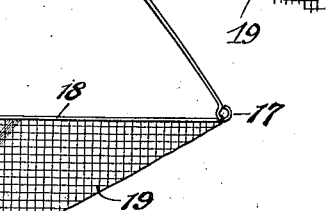
Effie M. Roberts,
INVENTOR,
WITNESSES
BY
ATTORNEY Patented July 24, 1923.

1,463,062

UNITED STATES PATENT OFFICE.

EFFIE M. ROBERTS, OF ST. LOUIS, MISSOURI.

FISHING TACKLE.

Application filed May 17, 1921. Serial No. 470,403.

*To all whom it may concern:*

Be it known that I, EFFIE M. ROBERTS, a citizen of the United States, residing at St. Louis and State of Missouri, have invented a new and useful Fishing Tackle, of which the following is a specification.

This invention relates to a new and improved fishing tackle and is more particularly directed to the combination of a fishing net provided with a collapsible frame and a plurality of hooks suspended from the frame and located in spaced relation from the fishing net.

An object of the invention is to provide a plurality of means for catching fish so co-operatively combined that when one fails, the other will provide a trap to prevent the escape of fish that have been in the immediate vicinity of the other member. To this end, a shaft is provided with a plurality of hooks that are adapted to be covered by some form of bait. Fish will be attracted by the bait in larger numbers than it would be possible to conveniently catch by means of hooks. I therefore provide a collapsible frame slidably mounted on and pivotally connected to a staff for carrying a net and which is adapted to be extended below the fishing hooks by the frame. It is possible with this combination to effect the capture of many more fish than otherwise would have been accomplished by just the mere employment of hooks, since any serious disturbance of the hooks as by pulling upon the supporting line for the frame would necessarily frighten the fish away, and since fish have a tendency to dive in a downward manner the net which is assembled below the hooks will provide a very effective means for trapping them.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is an elevation of my improved fishing tackle shown in operative position, while its inoperative position is shown in dotted lines.

Fig. 2 is a transverse section through the slidable sleeve along the line 2—2 of Fig. 1.

Fig. 3 is a vertical cross section through the sleeve, showing the pivotal connection of the radius rods in the outwardly-extending ears of the slidable sleeve.

Fig. 4 is a transverse section along the line 4—4 of Fig. 1.

Fig. 5 is a fragmentary view in section through the pivotal connection of the links on the staff.

Fig. 6 is an enlarged detail view of the end of the staff disclosing the manner of supporting the fish hooks.

In the drawings, 1 designates a fishing pole from which is suspended a float 2 by means of a fishing line 3 passing centrally through the float. The other end of the line 3 is secured to a ring 4 which is inserted through an eye formed in the upper end of the staff 5.

Slidably mounted on the staff 5 is a sleeve or collar 6 provided with pairs of radially projecting ears 7, and between each pair of ears is pivotally mounted a radius rod 8. Each rod 8 is provided with a pair of ears 9 near the pivotal connection of said rod with the slidable sleeve 6. A plurality of links 10 connect the rods 8 with the staff 5. Each link 10 is pivoted at one of its ends to an ear 9 and at its other end to a bifurcated lug 11, a plurality of which extend radially outward from the staff 5. The staff 5 has a reduced portion 12 extending from the point on the staff 5 where the bifurcated lugs are secured. The end of this portion 12 is perforated as shown broken away at 12ª in Fig. 6. Through which perforation is inserted a bar 13 provided on its ends with eyes 14 in this are secured the free ends of the guts 15 which carry the hooks 16.

The ends of the radius rods 8 are provided with eyes 17 which are adapted to support a cord 18 upon which the outer periphery of the net 19 is secured. The weight or sinker 20 is secured to the central portion and exteriorly of the net in order to maintain the net in lowered position when placed in the water net as seen from Fig. 1 is bowed outwardly and downwardly from the end of the staff 5, presenting a cone-shaped member with a sinker 20 at its apex.

A catch 21 pivotally and resiliently mounted within the slot 22 formed in the staff 5 is adapted when in depressed position within the slot to permit the sleeve 6 to ride on the shaft 5 and when in elevated position to engage the sleeve and prevent the frame from collapsing.

The operation of my device is as follows. The fishing tackle having been placed in the closed or folded position, as shown in dotted lines in Fig. 1, may be set in an operative position for fishing by shaking out the net 19, sliding the sleeve 6 downwardly along the shaft 5 until the upper end of the sleeve passes the catch 21, when the lower end of the catch which is resiliently pressed outwardly from its slot 22 within the shaft 5 will engage the upper edge of the sleeve 6 and prevent the sleeve from returning to its former position. As the sleeve 6 is pressed downwardly, the radius rods 8, by means of the links 10 will be forced outwardly as the sleeve 6 approaches the lugs 11 on the staff, to such an extent that the cord 18 which supports the net is stretched to its limit, spreading the net out beneath the hooks 16.

It will be seen that if bait is applied to the hooks 16 and the net and frame are lowered into the water and supported by means of the cord 3 and the float 2, fish will be attracted by the bait on the hooks 16. Any determined nibbling on the bait 16 will be indicated by the cork 2, when the rod 1 may be quickly raised and all fish that have been in the vicinity of the hooks 16 and which have not been caught by said hooks will be frightened and, as is natural with this kind of game, they will dive downwardly and be caught in the bowed portion of the net 19 as the said net and hooks are raised from the water. It will be apparent from the description that this construction is a more reliable device for not only catching fish but for trapping any fish that come within the confines of the net.

What is claimed is:—

1. In a fishing tackle, the combination of a collapsible frame, a net secured thereon and adapted to be expanded by said collapsible frame, a staff, said frame comprising a collar slidable on the staff, rods pivotally connected to and radiating from said collar, a plurality of links having pivotal connections with the radius rods and the staff, and a plurality of hooks suspended from the staff and in spaced relation with the net the expanded net when being raised from the water adapted to prevent loss of fish engaged by the hooks and to catch fish in the vicinity of the hooks.

2. In a fishing tackle for catching fish, the combination of a net secured to a collapsible frame, a staff upon which said frame has a sliding connection, said frame likewise having pivotal connection with the staff, the net being bowed outwardly from the staff, a bar passed through a perforation in the staff and provided with a plurality of suspended hooks, said bar adapted to distribute the hooks about the shaft and in spaced relation to the bowed portion of the net, the expanded net when withdrawn from the water and the hooks adapted to catch fish located within the confines of the net.

3. In a fishing tackle, the combination of a net, a collapsible frame suspended from a float, a staff, said frame having pivotal and slidable connections with the staff to expand the net, hooks suspended from the staff in spaced relation to the net, and means for locking the frame in position on the staff when the net has been expanded, the expanded net when raised from the water providing auxiliary means for catching fish and preventing loss of fish engaged by the hooks.

4. In a fishing tackle, the combination of a collapsible frame, a net secured thereon and adapted to be expanded by said collapsible frame, a staff provided with a reduced portion at its lower end and having a perforation therein, a bar inserted though said perforation and provided with a plurality of suspended hooks, in spaced relation to the net, said frame comprising a collar slidable on the staff, rods pivotally connected to and radiating from said collar, and a plurality of links having pivotal connections with the radius rods and staff, said collar being adapted to be lowered for extending the rods through the connecting links and spreading the net beneath the hooks, the central portion of the net being bowed outwardly and downwardly from the hooks and adapted to cooperate with the hooks to catch fish within the vicinity of said hooks when said net is withdrawn from the water.

In testimony that I claim the foregoing as my own, I have hereto affixed my signature.

EFFIE M. ROBERTS.